May 20, 1930. F. G. CORNELL, JR 1,759,440
APPARATUS FOR HEATING AND COOLING LIQUIDS
Filed May 27, 1926 2 Sheets-Sheet 2
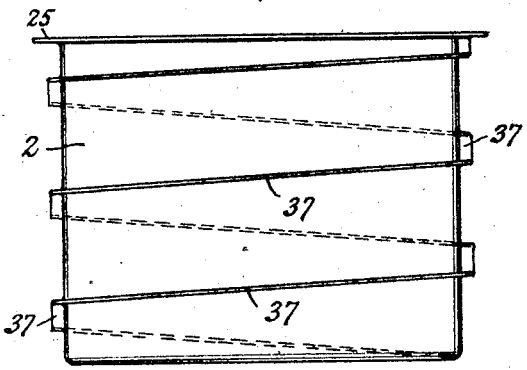
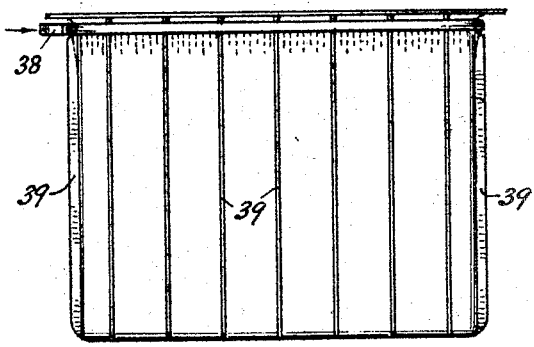
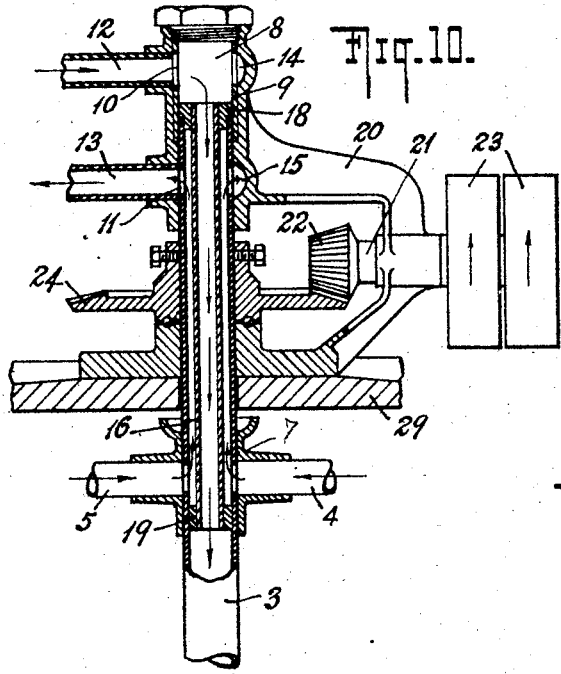
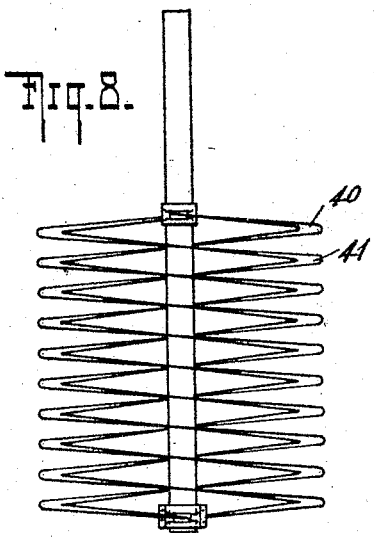
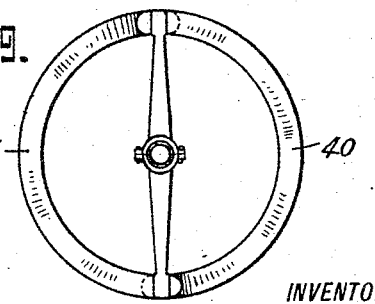
WITNESS
G. V. Rasmussen
INVENTOR
FRITZ G. CORNELL, JR.
BY
Briesen & Schrenk
ATTORNEYS Patented May 20, 1930

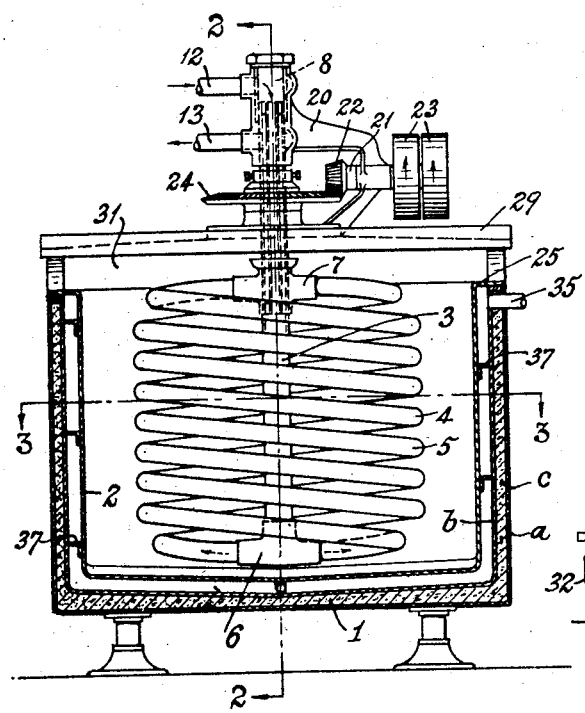
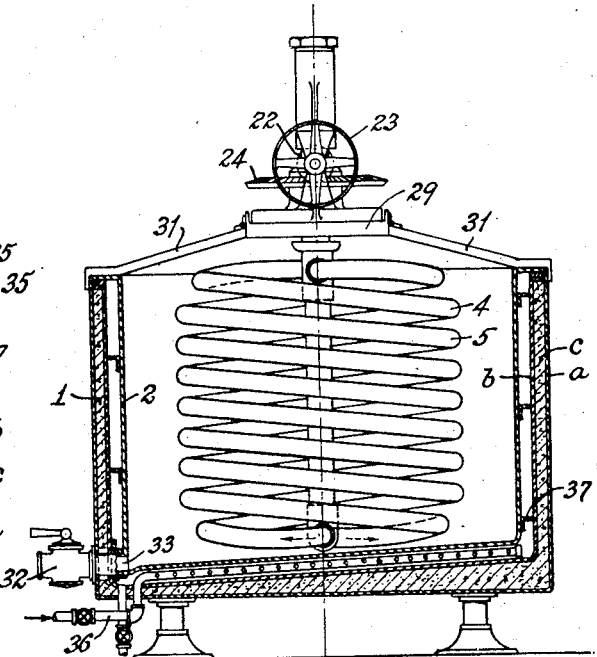
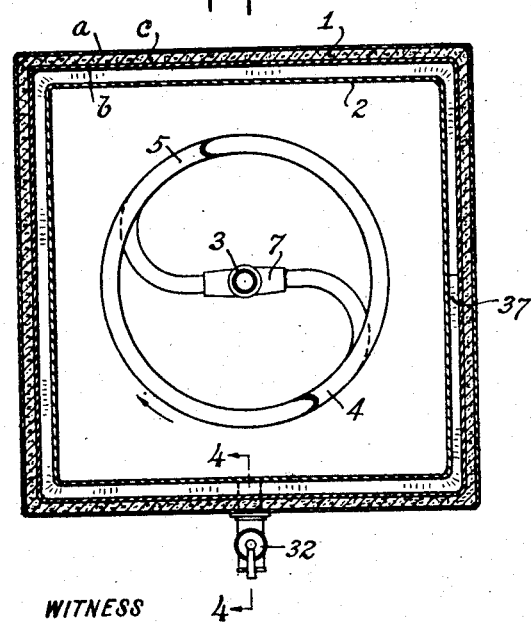
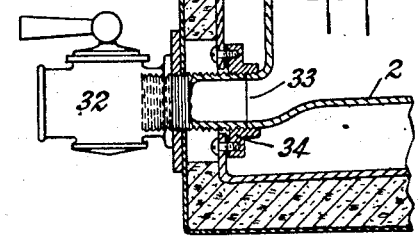
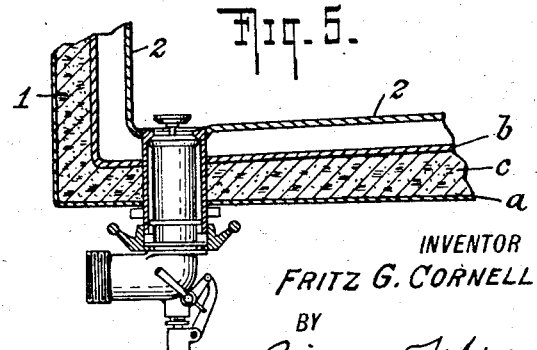

1,759,440

UNITED STATES PATENT OFFICE

FRITZ G. CORNELL, JR., OF CALDWELL, NEW JERSEY, ASSIGNOR, BY MESNE ASSIGNMENTS, TO JENSEN CREAMERY MACHINERY COMPANY, INC., OF BLOOMFIELD, NEW JERSEY, A CORPORATION OF NEW YORK

APPARATUS FOR HEATING AND COOLING LIQUIDS

Application filed May 27, 1926. Serial No. 111,965.

The present invention relates to an apparatus for heating or cooling liquids and semi-liquids, such as milk and its products which have been condensed or evaporated, and is especially adapted to such cooling or heating of milk or cream as may be required for performing all or part of the processes of pasteurization, neutralization, forewarming, standardizing, ripening, and development of cultures.

The object of my invention is an apparatus for cooling or heating liquids which will perform the necessary cooling or heating more efficiently than has been heretofore possible with the combination of a container of substantially circular cross-section at present in use with a surrounding heating or cooling means or element. A more particular object of my invention is to provide a receptacle of such shape and character as to make its removal for necessary repairs to its lining and its replacement by another receptacle, of the same or different material, a matter of simple accomplishment. A further object of my invention is the provision, in combination with the new form of receptacle, and surrounding heating or cooling element, of a stirring device so situated and rotated with respect to the material to be treated as to remove air, gas, and volatile matter from within the liquid and to prevent the introduction thereof into the same, to the ultimate improvement of the product being treated.

In the accompanying drawings, Fig. 1 is a vertical section of one form of my improved apparatus, Fig. 2 a vertical section of the same at right angles to Fig. 1, Fig. 3 a horizontal section on line 3—3 of Fig. 1, Fig. 4 a detail on the line 4—4 of Fig. 3, showing one form of outlet from the tank and the manner of its attachment thereto, Fig. 5 a detail of another form of outlet, Fig. 6 a side elevation of the inner tank showing one means for improving the circulation of the fluid heating medium between such inner tank and the outer casing, Fig. 7 a side of another form of the tank, Fig. 8 a side elevation and Fig. 9, a plan view of another form of the stirring mechanism to be more particularly referred to hereinafter. Fig. 10 is an enlarged detail of the upper portion of Fig. 1.

Referring to the drawings, 1 indicates a suitable receptacle or casing substantially rectangular in cross-section. As shown, such casing may consist of an outer jacket $a$, an inner jacket $b$ and an insulating filling, for instance, a cork, $c$, 2 is an inner receptacle or tank substantially square in horizontal cross-section, constructed preferably of steel lined on the interior with a coating of glass which may have been applied thereto, for instance, in liquid form by spraying. The receptacle may, however, be made of nickel or copper, the inner surface of the latter being tinned. This receptacle is provided with a stirring device consisting preferably of two helical tubes 4 and 5, corresponding ends of which are united respectively by T-shaped head 6, and a head 7, united by hollow central tube 3 which encloses an inner tube 16, so arranged as to serve as a means of conveying to and carrying away from the helical tubes liquid heating or cooling media. 8 is a stuffing box provided with packing glands 9 and two outlet openings 10 and 11 adapted to receive inlet and outlet pipes 12 and 13 respectively. (See Fig. 10.) The stuffing box 8 is provided with two annular channels 14, 15. The packing gland 9 is suitably apertured to permit communication between opening 10 and channel 14 and the interior of the stuffing box. The tube 3 enters the lower portion of the stuffing box and is suitably apertured to permit communication between openings 11 and channel 15 and the interior of the stuffing box. The other end of tube 3 enters head 7 and is suitably apertured to permit communication between its interior and the two helical coils 4 and 5. The outer tube 3 surrounds the inner tube 16 and is spaced therefrom by the heads 18 and 19 which, together with said inner tube, form complete closures, so that fluid flowing through said inner tube cannot pass into said outer tube except by first flowing through hollow shaft 3 and the helical tubes 4 and 5. The stuffing box 8 is carried by casting 20 with which it may be integral, the casting rotatably supporting a shaft 21 having at one end a pinion 22 and at the other pulleys 23 or other suitable driving mechanism, the pinion meshing with gear 24, which is suitably attached to tube 3 and adapted to rotate the same.

The stirring mechanism and associated parts are constructed and operated substantially in the manner of similar parts of the apparatus shown in the United States Letters Patent to Jensen, No. 924,233, dated June 8, 1909, and no claim of novelty is made herein broadly with respect to such stirring mechanism and associated parts.

The tank 2 is preferably provided with an exteriorly extending flange 25 by means of which it can be supported upon and attached to the upper rim of casing 1. Upon such flange rests a bridge 29 having hinged thereto covers 31, 31 which, when raised, permit access to be had to the interior of the tank and when closed, protect the contents thereof from contamination. The casting 20 and associated parts are preferably supported upon such bridge 29 as shown in Figs. 1 and 2.

Figs. 2 and 4 show (the latter in enlarged detail) one form of outlet from the tank 2. A cock 32 has its elongated casing extending through suitable apertures in outer jacket $a$ and inner jacket $b$ to contact with a suitably constructed outlet 33 in the tank 2, the outlet 33 and the casing being supported by a perforated plate 34 attached to the jacket $b$.

Fig. 5 illustrates a standard form of bottom outlet, so well known that it needs no detailed description, which I prefer to use whenever circumstances permit. This form of outlet offers a distinct advantage over the outlet shown in Fig. 4 as it does not furnish a pocket in which the milk, or other substance treated, may stagnate.

As shown in Fig. 1, the casing 1 may be provided with an outlet pipe 35 and as shown in Fig. 2 with an inlet pipe 36, so much of the latter as lies within the casing being preferably perforated. The heating or cooling medium may be introduced through pipe 36, pass upwardly into and through the chamber lying between the inner jacket $b$ and the tank 2 and pass out through pipe 35. In order to secure a proper distribution of such medium within the chamber, the tank 2 may be provided with a spiral flange 37 (see particularly Fig. 6) which flange may serve also as a spacing member between the tank and casing. I may, however, introduce the medium to the chamber through a pipe 38, perforated at suitable intervals along its lower portion (as shown in Fig. 7), and extending around the entire tank 2 preferably just below flange 25. When this pipe is used, the spiral flange 37 should not be employed but instead thereof, I use vertically extending flanges 39 as shown in Fig. 7, serving as spacing members and suitably apertured at or near the top to receive the perforated pipe 38.

Instead of the stirring device shown in Figs. 1, 2 and 3, provided with helical tubes, I may use, under certain conditions, a stirring device such as shown in Figs. 8 and 9 in which the helices 40, 41 are not tubular.

The operation of the apparatus is as follows:

The liquid to be treated (heated, cooled, agitated, standardized, neutralized, ripened, or mixed) is placed into tank 2 and the heating or cooling medium, as the case may be, for instance hot or cold water or brine, is introduced through tube 12 whence it flows through opening 10 into the interior of the stuffing box 8, through pipe 16 and the vertical hollow tube 3 and then through head 6 into helical tubes 4 and 5, thence through head 7 into the passage between tube 16 and tube 3, and out through opening 11 into tube 13 in the manner described in United States Letters Patent No. 924,233 hereinabove referred to. As the heating or cooling medium passes through the helical coils, the stirrer is rotated by means of gears 22, 24. At the same time a heating or cooling medium, as the case may be, is introduced through perforated pipe 36 filling the chamber formed between the casing 1 and tank 2, and after performing the heating or cooling, passes out through the outlet 35.

If the construction shown in Fig. 7 is employed, the heating or cooling medium is introduced through perforated pipe 38 and flows along the outer walls of tank 2, passing out through the bottom of casing 1 by any suitable opening. If for any reason it is not desired to effect a rapid change in the temperature of the material to be treated, I may substitute for the tubular stirrer the stirrer shown in Figs. 8 and 9 for which, of course, I need not provide any of the parts carried by the casting 20 as shown in Fig. 10, except the gear 24, shaft 21, pinion 22 and pulley 23.

It is, of course, obvious that as the function of the casing 1 is primarily to form one wall of the chamber lying between itself and tank 2, to permit the application of a fluid heating or cooling medium to the latter, any other device for affecting a change of temperature in tank 2 on its outside would be the equivalent of such container or chamber. Thus a coil of cooling pipes or an electrical heating coil might be employed for respectively cooling or heating the exterior of the tank 2.

When operating the stirrers, shown in Figs. 1 and 8, I do this preferably in a clock-wise direction viewed from the top as I have found that by so doing I lift out of the material to be treated, particularly milk, the air occluded therein, whereas by rotating in the opposite direction there is liability of introducing air into such material.

It is not essential that the stirrer should be provided with two helices 4 and 5 or 40, 41. Only one such helix need be employed, if circumstances warrant.

I do not claim to be the first to provide a square tank with helical stirrers such as shown in the drawings. Such an apparatus has been in public use in this country for some years; nor do I claim to be the first to provide a circular tank with such stirrers and with an exterior heating chamber, as such an apparatus has also been in public use for a number of years. I do, however, claim to be the first to provide a square tank with a helical stirrer and exterior heating or cooling means. The use of a square tank 2, presents various marked advantages over the use of a circular tank. It permits more economical use for floor space because, with a stirrer of the same size it makes it possible to treat a larger amount of liquid material than does a circular tank. It permits more ready access for cleaning the tank as the usual size of stirrer and circular tank is such that if the tank be built square of such dimensions that the sides are equal to the diameter of the present day circular tank, it will be possible for a workman to enter the corners and clean the tank by hand. While these advantages may seem obvious, it has not heretofore been believed possible to use a square tank because it was feared that the material to be treated would stagnate in the corners and that it would be over-heated or over-cooled therein. In the treatment of milk for which my apparatus is particularly designed, it is extremely important that the milk should circulate freely so that if it be heated, no portion thereof be subjected to the danger of scalding or burning and if it be cooled, that the cooling be uniform in order to prevent incubation of bacteria in any portion thereof, and, therefore, the use of a square tank, affording, in its corners, pockets in which the material might remain substantially motionless for a long time, seemed contraindicated. I have found however that contrary to expectation the use of the helical coils creates a strong circulation in such corners. This circulation was not suggested by the use of round tanks as in such tanks the helices set up a very strong circular motion which necessitated the use of vertical baffles extending inwardly from the inner walls of the tank to break up the swirling motion and permit an upward or downward circulation. The use of the square tank, as compared with the use of a round tank, whose diameter is the same as the length of a side of the former, not only avoids the necessity of the use of the interior baffles but produces a more gentle circulation of the material to be treated and a more rapid freeing of the contained air by the helices.

While, so far as I am at present aware, a tank whose horizontal cross-section forms a square is the best form to use, it is obvious that the advantages of my invention may be obtained, even if to somewhat a lesser degree, if the cross-section were a rhomb or an oblong provided that the shape of the tank is not such as to prevent a reasonably complete circulation at all times throughout all parts thereof. For instance, with a stirrer 54 inches in diameter, the ideal form of tank might be a square tank whose sides are 66 inches long. It would, however, be possible to obtain many of the advantages of my invention by making one pair of opposite sides 84 inches long. When I speak in my claims of a square tank, I include as equivalents such tanks whose horizontal cross-sections are substantially rhombs or oblongs.

I claim:

1. In an apparatus of the character described, in combination, a square tank, a container surrounding the same, a hollow helical stirrer within the tank, means for rotating the stirrer, a pipe for leading a fluid to and a pipe for leading the fluid away from the interior of the stirrer, said stirrer being operative to cause a liquid in said square tank to flow in a substantially upward direction adjacent to the walls of said tank, means for conducting a fluid to the upper portion of said container and for withdrawing such fluid from the bottom thereof, and flanges arranged in said container to cause circulation of said fluid in said container in a downward direction, whereby said liquid and said fluid travel in counter-current relationship and rapid and efficient heat interchange therebetween is promoted.

2. In an apparatus of the character described, in combination, a square tank, a container surrounding the same, a helical stirrer within the tank, means for rotating the stirrer, whereby circuation of liquid in said square tank adjacent to the walls of such tank is induced, and means for causing circulation of a fluid in said container in a direction counter to the flow of said liquid adjacent to said walls, whereby a rapid and efficient heat interchange between said liquid and fluid is promoted.

FRITZ G. CORNELL, JR.